United States Patent
Hollinger et al.

(10) Patent No.: US 7,472,181 B2
(45) Date of Patent: Dec. 30, 2008

(54) AUTOMATED REAL-TIME APPOINTMENT CONTROL BY CONTINUOUSLY UPDATING RESOURCES FOR POSSIBLE RESCHEDULING OF EXISTING APPOINTMENTS

(75) Inventors: Mary F. Hollinger, Antioch, TN (US); Diana S. Allen, Margate, FL (US)

(73) Assignee: BellSouth Intellectual Property, Wilmington, DE (US)

( * ) Notice: Subject to any disclaimer, the term of this patent is extended or adjusted under 35 U.S.C. 154(b) by 530 days.

(21) Appl. No.: 09/896,471

(22) Filed: Jun. 29, 2001

(65) Prior Publication Data

US 2003/0005124 A1    Jan. 2, 2003

(51) Int. Cl.
G06F 15/173 (2006.01)
H04M 3/42 (2006.01)
G06F 9/46 (2006.01)

(52) U.S. Cl. ............... 709/224; 379/201.12; 705/5; 705/8

(58) Field of Classification Search ............... 709/203, 709/218; 705/2, 5–8; 701/201
See application file for complete search history.

(56) References Cited

U.S. PATENT DOCUMENTS

| | | | | |
|---|---|---|---|---|
| 5,920,846 | A * | 7/1999 | Storch et al. | 705/7 |
| 5,948,040 | A * | 9/1999 | DeLorme et al. | 701/201 |
| 6,115,642 | A * | 9/2000 | Brown et al. | 700/104 |
| 6,345,260 | B1 * | 2/2002 | Cummings et al. | 705/8 |
| 6,349,238 | B1 * | 2/2002 | Gabbita et al. | 700/101 |
| 2001/0027481 | A1 * | 10/2001 | Whyel | 709/218 |
| 2002/0032588 | A1 * | 3/2002 | Glazer et al. | 705/6 |
| 2002/0198756 | A1 * | 12/2002 | Ghaisas et al. | 705/8 |
| 2004/0190699 | A1 * | 9/2004 | Doherty et al. | 379/201.12 |

OTHER PUBLICATIONS

Glazer, et al: U.S. Appl. No. 60/222,129, filed Jul. 31, 2001.*

* cited by examiner

Primary Examiner—Wen-Tai Lin
(74) Attorney, Agent, or Firm—Woodcock Washburn LLP (57) ABSTRACT

An appointment control system provides high speed, real-time appointment setting capabilities. The sequential processing of service orders and a continuously updated dispatch database, ensure appointment setting reliability, in that there is little opportunity for overbooking technician network resources. The appointment control system, thereby, minimizes the occurrence of missed and rescheduled appointments. In the event a technician network resource is reduced, the dispatch database can be instantly modified to reflect the change. The appointment control system is configured to automatically recognize a modification in the dispatch database and to transmit notices to appointment setters that appointments utilizing that technician network resource must be changed. Where possible, the appointment control system will automatically reassign such appointments to other available technician network resources, without requiring the involvement of the appointment negotiators.

18 Claims, 6 Drawing Sheets

DISPATCH DATABASE RECORD

**Schedule for Week of March 5, 2000;
Service Technician No. 1234567**

AUTOMATED REAL-TIME APPOINTMENT CONTROL BY CONTINUOUSLY UPDATING RESOURCES FOR POSSIBLE RESCHEDULING OF EXISTING APPOINTMENTS

FIELD OF THE INVENTION

The present invention generally relates to setting appointments for service visits. More particularly, the present invention relates to an automated system for setting appointments on a real-time basis to avoid over-commitment of resources.

BACKGROUND OF THE INVENTION

Appointment setting systems are commonly used by large companies to maintain control over the scheduling of appointments for resources such as service calls by repair personnel. Unfortunately, many such appointment setting systems are paper-based and prone to over-commitment of resources. For example, such systems often permit the entry of appointments for the same time and/or for the same service personnel. Moreover, such systems often fail to account for changes in resources, such as unexpected absence of service personnel.

Appointment setting for a service technician pool (technician network) provides a good example for the purposes of this discussion, because service technician network appointment setting is so well known for over-commitment problems. In the conventional appointment setting system, a group of people, collectively referred to as a filter, is used to maintain the schedules of available service technicians in a technician network.

A customer needing a service technician will contact an appointment setter (appointment negotiator) to arrange for a service appointment. The negotiator will obtain information from the customer to prepare a service order. The service order can include material such as the appointment time preference, the service task desired, and the location of the desired appointment. This information can be passed to the filter in the form of a service order. The filter will compare the service order information with the technician network capacity to determine whether the service order can be fulfilled by the technician network.

The filter maintains one or more lists of the technicians available for each particular day. When the listed capacity is exhausted, the filter rejects service orders received from an appointment setter and notifies the appointment negotiator that the service order must be rejected. The appointment negotiator must then contact the customer and attempt to arrange an alternate time.

Because more than one person operates as the filter, however, the potential for overbooking always exists, because one filter personnel may not know when another filter personnel has committed the last of a limited resource. Accordingly, it is commonplace that technicians are overbooked in such an appointment setting system.

Overbooking technicians requires the appointment negotiators to contact the customer and reschedule an appointment. This is an expensive use of the time of the appointment negotiator personnel. Rescheduling service technician appointments is usually inconvenient for the customer and is, therefore, to be avoided. Often, overbooking will simply result in the failure of a technician to meet the appointment, despite the fact that the customer is waiting for the technician. This can happen when insufficient time exists before the appointment time for the appointment negotiator to contact the customer and reschedule. In many states, regulated industries are required to reimburse customers for missed service appointments. In any case, missed and rescheduled service appointments are inefficient and harmful to a company's good will.

Therefore, there is a need in the art for an appointment setting system that minimizes missed appointments and rescheduled appointments. The appointment setting system should provide real-time information pertaining to the capacity of a technician network and should minimize the time between a change in technical capacity and the notification of that change to the appointment negotiator. The system should also process service orders in sequence, thereby reducing the potential for overbooking.

SUMMARY OF THE INVENTION

The present invention provides an automated appointment setting system that coordinates the efforts of an appointment negotiator group and a technician network in real-time. An appointment control system is used to process service orders and repair requests generated by the appointment negotiators. Appointment confirmations are sent back to the appointment negotiators, when appointments are successfully set. The appointment control system uses a dispatch database to maintain records on the available capacity of the technician network. The appointment negotiators transmit a service order to the appointment control system by accessing a corporate gateway. The corporate gateway provides an access point to the appointment control system for appointment negotiators in various locations.

The appointment control system is an automated processor of service orders that replaces the conventional filter and provides many additional functions. The appointment control system processes service orders in real-time, in that it accesses continuously updated information about the availability and capacity of the technician network. This information is maintained and continuously updated in the dispatch database. The appointment control system queues service orders from the appointment negotiators and processes them in sequence. Accordingly, each service order is processed in light of the continuously updated technician capacity information maintained in the dispatch database. Accordingly, overbooking will rarely occur as a result of incorrect technician capacity information.

If the appointment control system checks the dispatch database and determines that the technician network has the requisite technician capacity to fulfill a service order, the appointment control system will transmit an appointment confirmation to the appointment negotiators. An appointment negotiator may then notify the calling customer that the service order has been processed and that the appointment has confirmed. Because the appointment control system operates in a real-time fashion, the appointment confirmation is quickly available and highly reliable.

In another aspect of the invention, the appointment control system can be accessed by third party service providers through a third party access sub-system. A third party service provider may access the appointment control system via a third party access gateway. Once a third party provider has been permitted access through the third party access gateway, the third party provider can process service orders and receive appointment confirmations just as with the appointment negotiators.

The appointment control system provides high speed, real-time appointment setting capabilities. Appointments set using the appointment control system are highly reliable, in that there is little opportunity for overbooking technician network resources. The reliability of the appointments is reinforced by the sequential processing of service orders and by the continuously updated technical network resource information in the dispatch database. Thus, the appointment control system minimizes the occurrence of missed and rescheduled appointments.

In the event that the technician network resource capacity is changed (e.g., a technician calls in sick), the dispatch database can be modified to reflect the change. The appointment control system can be configured to automatically recognize a modification in the dispatch database and to transmit notices to the dispatch center that appointments utilizing that technician network resource must be changed. In addition, the appointment control system can automatically re-assign such appointments to other available technician network resources, without requiring the involvement of the dispatch center.

The various aspects of the present invention may be more clearly understood and appreciated from a review of the following detailed description of the disclosed embodiments and by reference to the drawings and claims.

DETAILED DESCRIPTION

Figure 1:
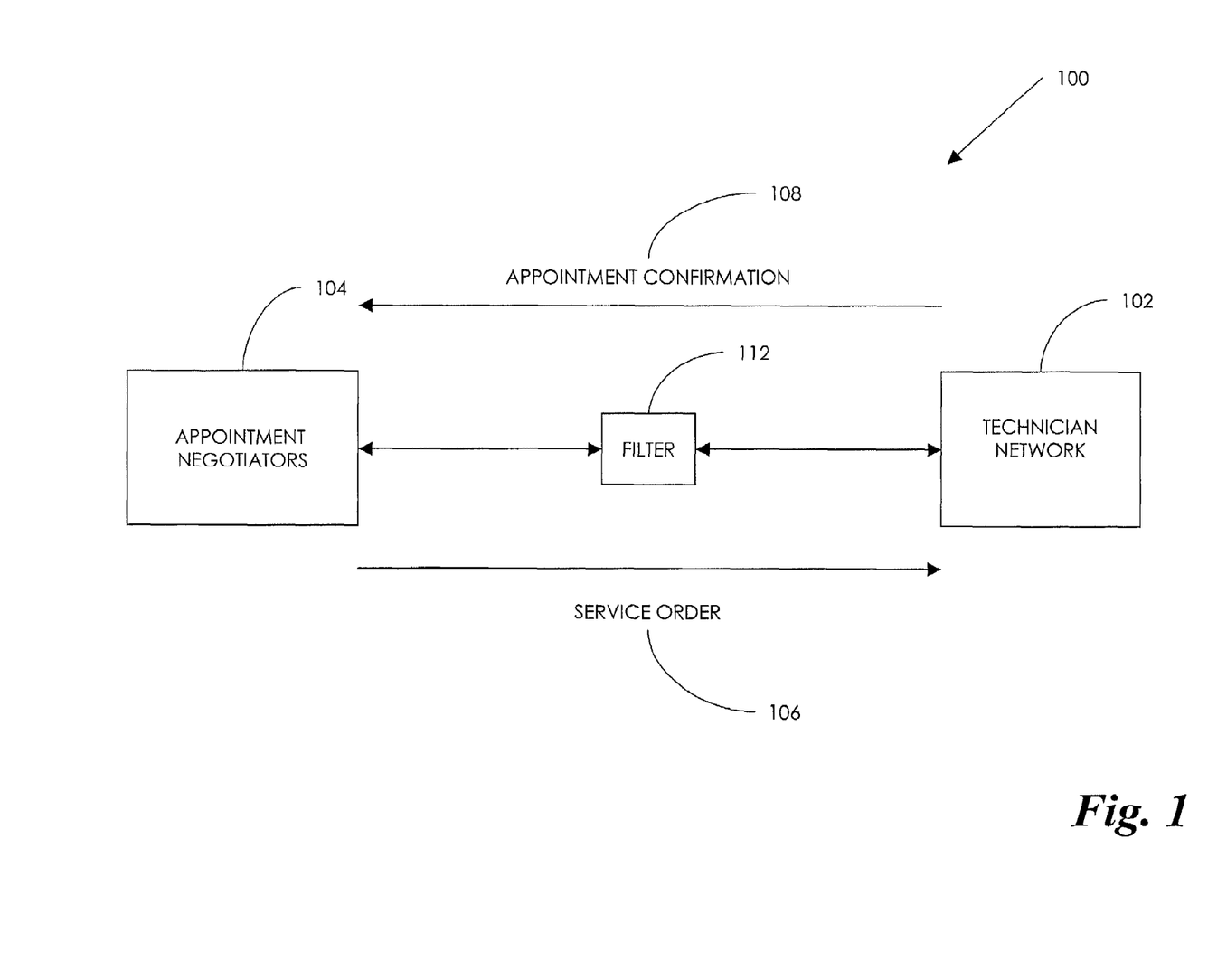
FIG. 1 is a block diagram depicting a conventional appointment setting system.

FIG. 1 is a block diagram of a conventional appointment setting system. In the conventional appointment setting system, a customer seeking to arrange for a visit by a service technician will contact an appointment negotiator 104. The appointment negotiator will obtain a predefined information set from the customer and will convert that information to service order. The predefined information set may include an appointment time, an appointment location, and the service task desired. The negotiator will attempt to move the service order in the direction of arrow 106 to the technician network 102. The technician network is a group of technicians that are available for fulfilling entered service orders.

Naturally, the technician network will have some finite capacity for fulfilling entered service orders. Unfortunately, in the conventional appointment setting system 100 of FIG. 1, that capacity is not always determinable. For example, the technician network may be assigned service orders under an assumption that a technician would be available on the day for which the service orders were promised to be fulfilled. If that service technician is unexpectedly unavailable that day, then the assigned service orders cannot be filled by that service technician.

In the conventional appointment setting system 100, a filter 112 is implemented to maintain the schedules of available service technicians in the technician network 102. The filter counts the number of orders in the dispatch pool and the number of hours the technician is available, and the filter personnel updates a database that the negotiator reviews that tells the negotiator that a day is full and that no more appointments should be made for that day. The filter never knew about how many orders had been taken until the orders had been received into the dispatch system. This method was not real time because the flow through process could take days. Therefore, it was just a best guess as to when to label a day as being full. The filter could close a day when the dispatch pool was full, but there may be many orders in the queue from the time the negotiator took the order until it was in the dispatch pool. Accordingly, it was commonplace that the personnel operating as the filter 112 would overbook technicians, because there was no means for reconciling the available capacity lists maintained by separate appointment negotiators.

Overbooking technicians requires the appointment negotiators to contact the customer to reschedule an appointment. This is an expensive use of the time of the appointment negotiator personnel. Rescheduling service technician appointments is usually inconvenient for the customer and, therefore, to be avoided. Often, overbooking will simply result in the failure of a technician to meet the appointment, despite the fact that the customer is waiting for the service technician to arrive. This can happen when insufficient time exists before the appointment time for the appointment negotiator to call the customer and reschedule. In many states, regulated industries are required to reimburse customers for missed service appointments. In any case, missed and rescheduled service appointments are inefficient and harmful to a company's good will.

Figure 2:
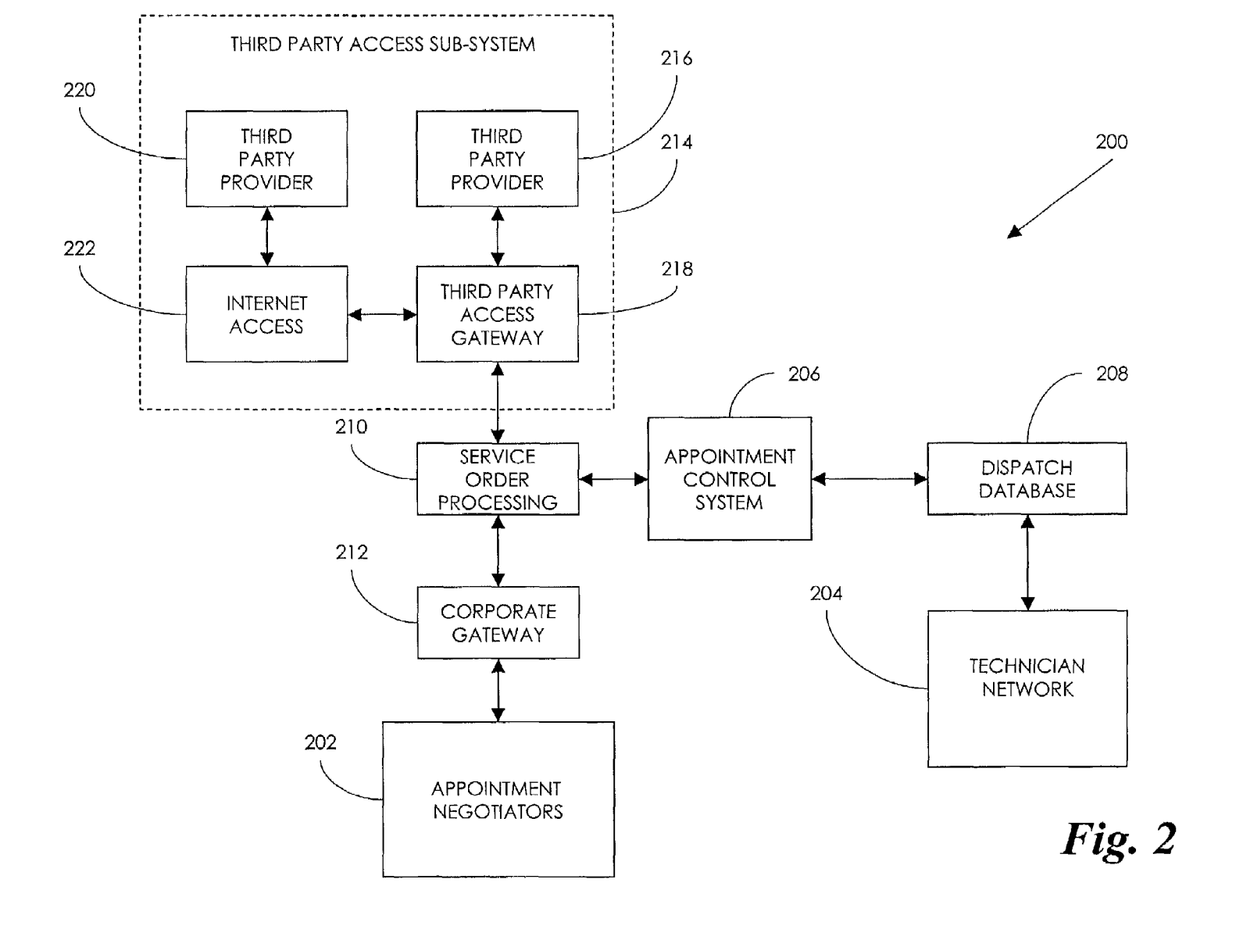
FIG. 2 depicts an appointment setting system that is an exemplary embodiment of the present invention.

FIG. 2 depicts an appointment setting system 200 that is an exemplary embodiment of the present invention. The appointment setting system 200 includes an appointment negotiator group 202 as well as a technician network 204. Those skilled in the art will appreciate that the technician network need not be a group of service technicians but could be a collection of any resource for which appointment setting is needed.

An appointment control system 206 is used to process service orders generated by the appointment negotiators 202 and the appointment confirmations that are sent back to the appointment negotiators. The appointment control system 206 is a computer-implemented system that is electronically accessible by the appointment negotiators and uses a dispatch database 208 to maintain records on the capacity of the technician network 204. The appointment negotiators 202 will transmit a service order to the appointment control system 206 by accessing a corporate gateway 212.

The corporate gateway 212 provides an electronic access point for appointment negotiators in various locations. The corporate gateway 212 provides, among other things, security by limiting access to authorized appointment negotiators and other authorized entities. The service order transmitted by the appointment negotiators 202 will be processed by service order processing unit 210. The service order processing unit 210 will accept raw customer information from the appointment negotiators 202 and will format the service order for processing by the appointment control system 206.

The appointment control system 206 is an automated processor of service orders. The appointment control system processes the service order request for an appointment in real-time, in that it accesses up-to-date information about the availability and capacity of the technician network 204. This information is updated and maintained in the dispatch database 208. The appointment control system 206 queues service order requests from the appointment negotiators 202 and processes the service orders in sequence.

The appointment control system 206 can be implemented as a high-speed computer-based processor. Unlike the conventional filter, the appointment control system can, therefore, process service orders in sequence at high throughput rates. Accordingly, each service order is processed in light of the updated technician capacity information maintained in the dispatch database 208. The capacity of a given technician network resource will be decremented in the dispatch database 208, according to the capacity requirements of each sequentially-processed service order. Accordingly, no overbooking will occur as a result of incorrect technician capacity information. In the appointment setting system 100 of FIG. 1, the multiple personnel in the filter 112 could process service orders in parallel, thereby increasing the likelihood of overbooking a technician network resource, as a result of incorrect capacity information.

If the appointment control system 206 checks the dispatch database 208 and determines that the technician network 204 has the requisite technician capacity to fulfill a service order, the appointment control system 206 will transmit an appointment confirmation to the appointment negotiators 202. An appointment negotiator may then notify the calling customer that the service order has been processed and that the appointment has been confirmed. Because the appointment control system 206 operates in real-time, the appointment confirmation is quickly available and highly reliable. Another advantage that the exemplary appointment setting system 200 provides is the ability to select very specific appointments. In the appointment setting system 100 of FIG. 1, it was not uncommon that an appointment would be set for a very broad window, such as a morning or an afternoon on a particular day. The appointment setting system 200 of FIG. 2 enables higher resolution appointment setting, because the appointment control system 206 operates in real-time in conjunction with a continuously updated dispatch database.

The appointment control system 206 can be accessed by third party service providers 216, 220 through a third party access sub-system 214. A third party service provider 216 may access the appointment control system 206, via a third party access gateway 218. The third party access gateway 218 performs many of the functions of the corporate gateway 212. However, the security constraints on the third party access gateway 218 must be more rigid to reduce the potential for unauthorized access to the appointment control system 206. However, once a third party provider has been permitted access through the third party access gateway 218, the third party provider can process service orders and receive appointment confirmations just as with the appointment negotiators 202. Of course, those skilled in the art will appreciate that the access of the third party provider 216 could be limited to a subset of those actions authorized for the appointment negotiators 202.

Other third party providers 202 may access the third party access gateway 218, using Internet access 222. Among other things, the third party access gateway 218 may include the functionality of a firewall to prevent unauthorized access through the Internet.

The appointment control system 206 provides high speed, real-time appointment setting capabilities. Appointments set using the appointment control system 206 are highly reliable, in that there is little opportunity for overbooking technician network resources. The reliability of the appointments is reinforced by the sequential processing of service orders and by the continuously updated technical network resource information in the dispatch database 208. Thus, the appointment control system 206 reduces the occurrence of missed and rescheduled appointments. Moreover, in the event a technician network resource is changed (e.g., a technician calls in sick), the dispatch database 208 can be modified to reflect the change. The appointment control system 206 can be configured to automatically recognize a modification in the dispatch database 208 and can transmit notices to the dispatch center 202 that appointments assigned to that technician network resource must be changed. In addition, the appointment control system 206 can automatically re-assign such appointments to other available technician network resources, without requiring the involvement of the dispatch center 202.

Figure 3:
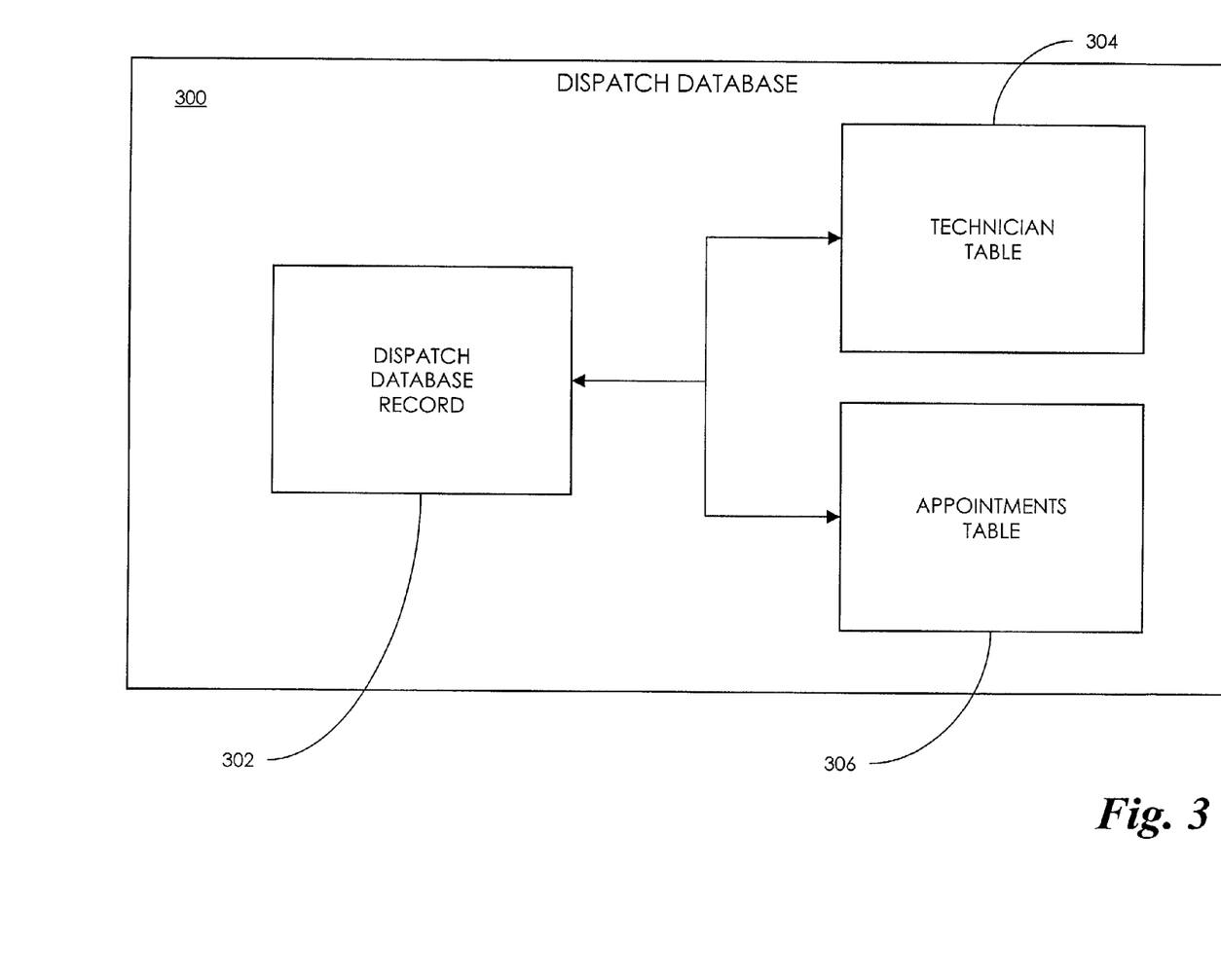
FIG. 3 is block diagram of an exemplary dispatch database.

FIG. 3 is block diagram of an exemplary dispatch database 300. The dispatch database 300 has a dispatch database record 302 that contains information maintained in a technician table 304 and an appointments table 306. The dispatch database record 302 is used to associate a technician from the technician table 304 and an appointment from the appointments table 306. The appointment control system 200 depicted in FIG. 2 can create a dispatch database record 302 in the dispatch database and can access the technician table 304 and the appointments table 306 to associate this information in the form of the dispatch database record.

The technician table 304 may include various information pertaining to technician network resources. For example, the technician table 304 may include a list of technicians, a list of services for which service orders may be accepted, and each technician's work schedule. Accordingly, when a service order is received by the appointment control system, the appointment control system can check with the dispatch database 300 to determine the availability of technician network resources. The appointment control system might first access the technician table 304 to determine which technicians are qualified to perform the task identified by the service order. The appointment control system may also check the technician table to determine which of these qualified technicians is available at the requested appointment time. Finally, the appointment control system might check the technician table 304 to determine how long completion of the desired task normally requires. Once all of this information has been gathered, the appointment control system can select the first technician that is qualified to perform the desired task and has an available window sufficient to complete the desired task. This information can be stored as a dispatch database record 302 and can also be passed to an appointments table 306. The dispatch database record 302, therefore, acts as a tangible manifestation of the service order and is stored in the dispatch database for future reference and/or modification. The appointments table 306 can be used to coordinate all set appointments, so that a single access point can be used to determine what technician network resources have been committed. Advantageously, the appointments table 306 can be electronically provided to the dispatch center in a graphical form that permits the dispatch center to quickly determine available appointment times prior to transmitting a service order. For example, the appointments table 306 could be presented in a color-coded representation, thereby enabling the appointment negotiators to quickly and easily identify available and previously committed appointment times.

Figure 4:
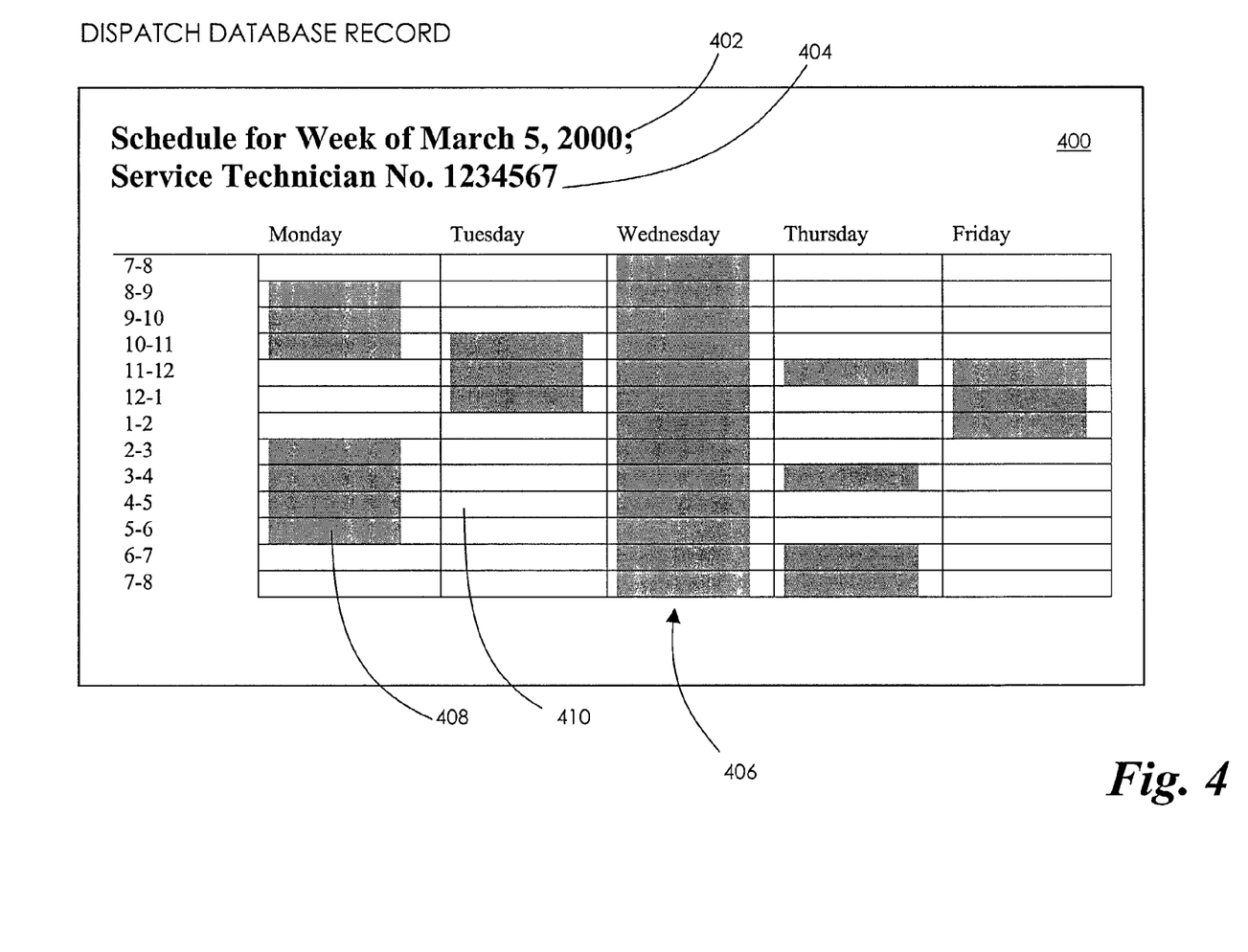
FIG. 4 is a block diagram depicting an exemplary dispatch database record.

FIG. 4 is a block diagram depicting an exemplary dispatch database record 400. The dispatch database record 400 is associated with a particular time frame 402. In the example of dispatch database record 400, the time frame 402 is a one week time period. The dispatch database record 400 can also be associated with a particular service technician. In the example of dispatch database record 400, the dispatch database record 400 is associated with a service technician by a service technician number 404. The dispatch database record 400 can contain information pertaining to the availability of the service technician during the applicable time frame. Although this information is depicted in a calendar form in the example of FIG. 4, those skilled in the art will appreciate that the appointment information could be stored in various ways. The calendar of FIG. 4 includes columns representing days during the applicable time period. Available times for the service technician are shown in un-shaded cells 410. Unavailable times are depicted as shaded cells 408. Naturally, a technician may be unavailable for various reasons including, but not limited to, a booked appointment, illness, vacation, and break-time.

Figure 5:
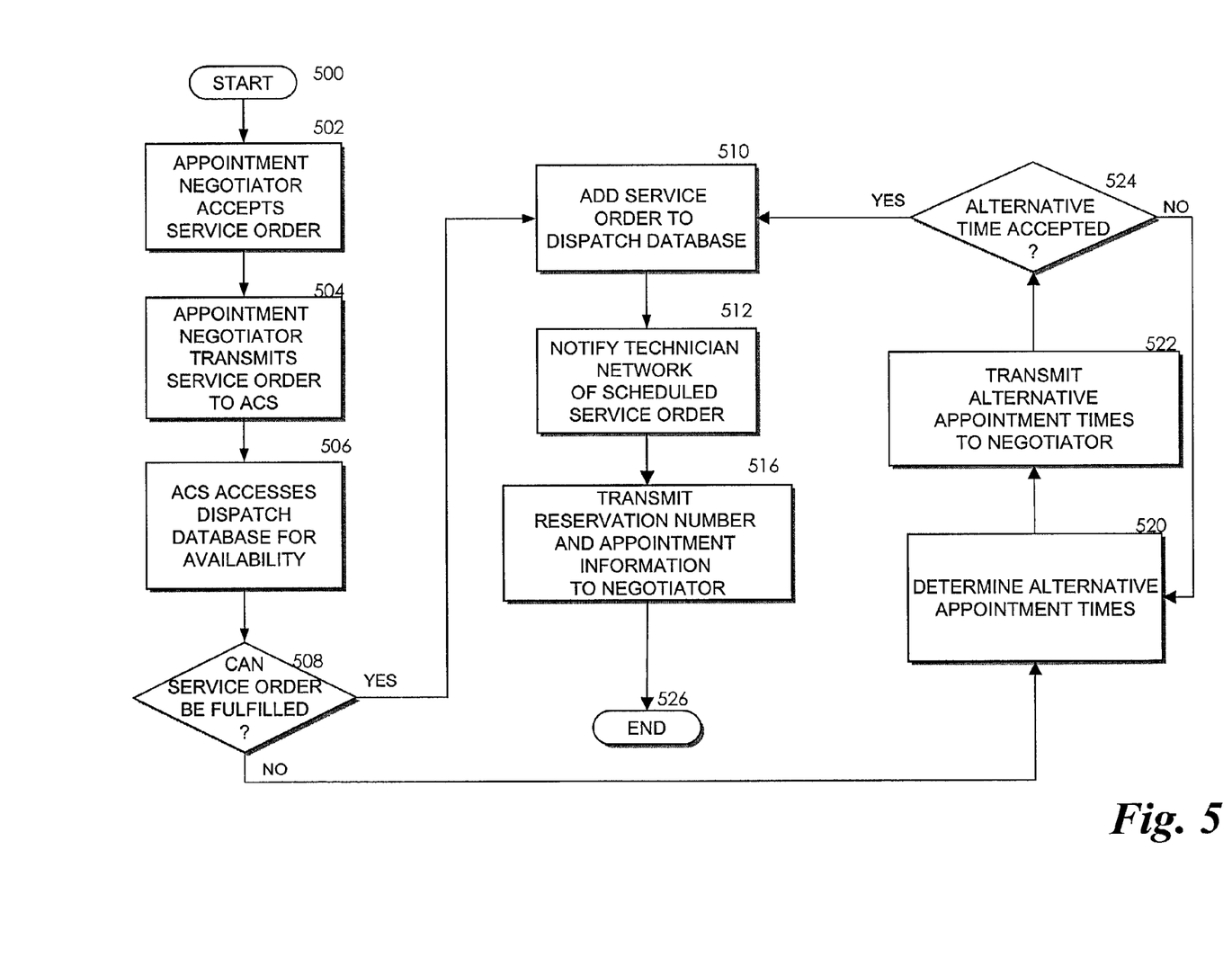
FIG. 5 is a flow chart depicting an exemplary method for setting appointments in real-time.

FIG. 5 is a flow chart depicting an exemplary method for setting appointments in real-time. The method begins at step 500 and proceeds to step 502. At step 502, an appointment negotiator accepts a service order request from a customer. The method proceeds from step 502 to step 504, wherein an appointment negotiator transmits the service order to the appointment control system (ACS). The method then proceeds to step 506.

At step 506, the appointment control system accesses a dispatch database to determine the availability of the requested appointment. The method proceeds to decision block 508, wherein a determination is made as to whether the service order can be fulfilled. That is, a determination is made as to whether a service technician qualified to perform the requested service is available for a long enough time to complete the service at the requested appointment time.

If the service order can be fulfilled, the method branches to step 510. At step 510, the service order is added to the dispatch database, thereby reducing the availability of the service technician. The method proceeds from step 510 to step 512.

At step 512, the technician network is notified of the scheduled service order. The method then proceeds to step 516, wherein the reservation number and appointment information is transmitted back to the negotiator in the form of an appointment confirmation. The method then proceeds to step 526 and ends.

Returning now to decision block 508, if a determination is made that the service order cannot be fulfilled, the method branches to step 520. At step 520, one or more alternative appointment times is determined by reference to the dispatch database. That is, an attempt is made to determine whether a qualified technician is available in a time slot near the requested appointment time. The method then proceeds to step 522. At step 522, the alternative appointment times are transmitted to the appointment negotiator. The appointment negotiator can relay the alternative appointment times to the customer for approval or disapproval. The method proceeds from step 522 to decision block 524. At decision block 524, a determination is made as to whether the alternative time is accepted by the customer. If the alternative time is not accepted, the method branches to step 520 and continues, as described above, until a satisfactory alternative appointment time is accepted. On the other hand, if the alternative time is accepted, the method branches from decision block 524 to step 510. The method proceeds from step 510 as described above.

Figure 6:
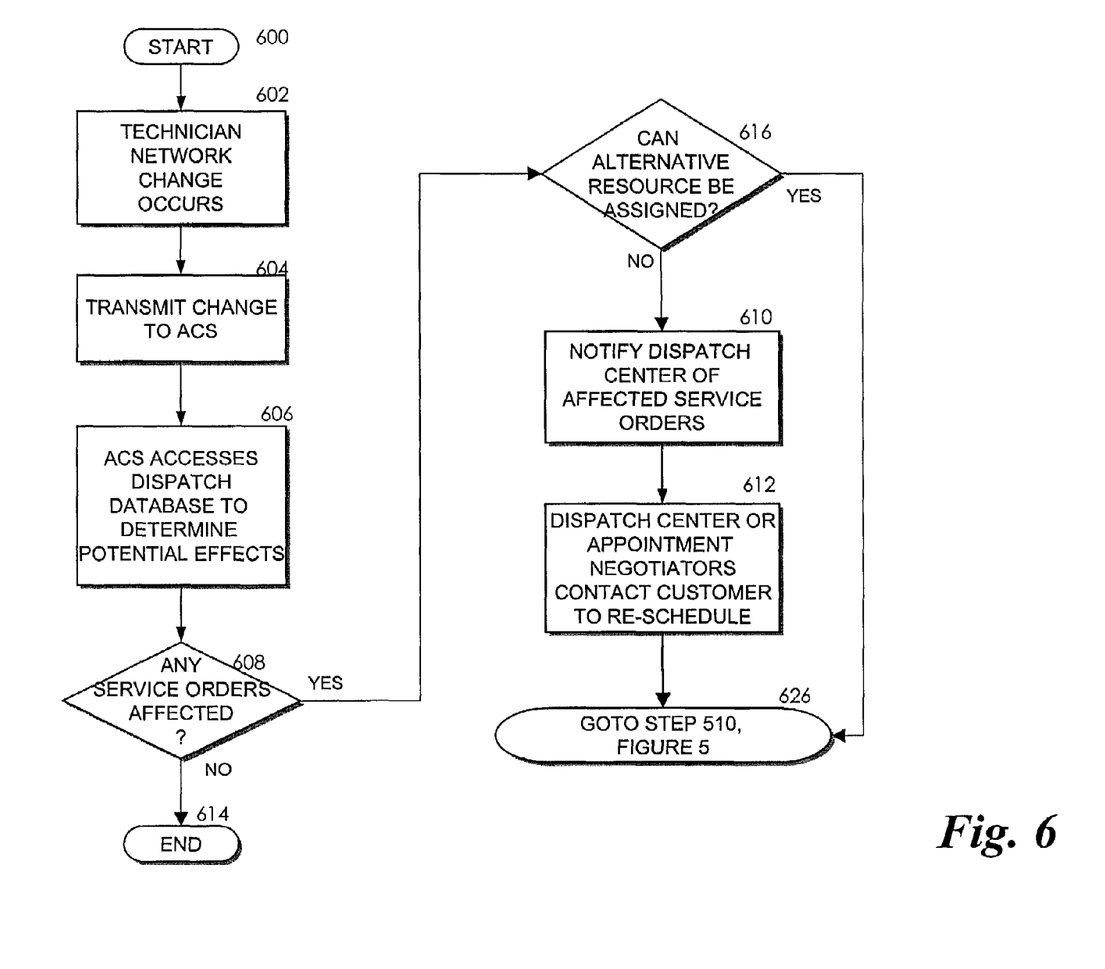
FIG. 6 is a flow chart depicting an exemplary method for responding to a change in technician network resource capacity.

FIG. 6 is a flow chart depicting an exemplary method for responding to a change in technician network resource capacity. The method begins at step 600 and proceeds to step 602. At step 602, a change in the technician network occurs. This change may be an increase or reduction in the technician network capacity. Obviously, an increase in technician network capacity seldom creates difficulty for appointment negotiators. On the other hand a decrease in technician network capacity often creates a need to reschedule or reassign appointments. The method proceeds from step 602 to step 604, wherein the network change is transmitted to the appointment control system. The method then proceeds to step 606.

At step 606, the appointment control system accesses the dispatch database to determine the potential effects of the technician network change. The method proceeds to decision block 608, wherein a determination is made as to whether any service orders are affected by the technician network change. If no service orders are affected, then method proceeds to step 614 and ends. Although not shown in the flow chart of FIG. 6, it will be appreciated that the changes can be reflected in the technician table (element 304 of FIG. 3) to reflect the technician network change.

Returning now to decision block 608, if a determination is made that at least one service order is affected by the change, the method branches to decision block 616. At decision block 616, a determination is made as to whether any alternative technician network resource can be assigned to the affected service order. If an alternative resource can be assigned, the method branches from decision block 616 to step 510 of FIG. 5 via connector 626. As described above, steps 510 through 526 of FIG. 5 will modify the dispatch database and notify the technician network and appointment negotiators that the appointment has been set. In this case, the set appointment will be the reassignment of the appointment to another technician network resource. Advantageously, this automated reassignment will not normally require the notification of a customer.

If, on the other hand, a determination is made at decision block 616 that no alternative resource can be assigned, the method branches to step 610. At step 610, the appointment negotiators are notified of the affected service orders and the need to reschedule. The method then proceeds to step 612, wherein the appointment negotiators attempt to contact the affected customers to reschedule the service appointments. The method then proceeds to step 510 of FIG. 5, via connector 626 and proceeds from step 510 as described above.

Advantageously, the automated appointment setting and automatic response to changes in the availability of technician network resources provides a high speed, real-time appointment setting system. The inventors contemplate that the various embodiments described can be implemented by computer resources interconnected on a local area network or on the Internet. Accordingly, an exemplary embodiment of present invention provides an automated appointment setting system capable of responding quickly to service order entries and network resource changes to provide highly-reliable appointment-setting capabilities.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computerized appointment setting system for assigning a service order to a network resource, comprising:
   an appointment negotiator operative to
      receive a service order from a customer, the service order comprising a requested appointment time; and
      deliver an appointment confirmation or an appointment rejection to the customer;
   a dispatch database comprising a technician and an appointments table, the dispatch database operative to maintain a dispatch database record of appointments previously assigned to a network resource; and an appointment control system operative to
- receive the service order from the appointment negotiator;
- receive updated availability and capacity information associated with the network resource;
- determine whether the network resource can fulfill the service order based on the updated availability and capacity information;
- assign a requested appointment associated with the service order to the network resource and send an appointment confirmation to the appointment negotiator, in response to a determination that the network resource can fulfill the service order;
- continuously update the dispatch database to determine whether a change has occurred to the dispatch database record associated with the network resource;
- determine whether the change affects the appointment associated with the service order, in response to a determination that a change to the dispatch database record associated with the network resource has occurred;
- determine whether another network resource from the technician table is qualified to fulfill the service order and is available at the requested appointment time, in response to a determination that the change affects the appointment associated with the service order;
- if another qualified network resource is available to fulfill the service order at the requested appointment time, automatically reassign the appointment to the other qualified network resource without requiring the involvement of the appointment negotiator;
- notify the appointment negotiator to reschedule the service order, in response to a determination that no other qualified network resource is available to fulfill the service order at the requested appointment time, wherein the appointment negotiator contacts the customer to reschedule the service order at an alternative appointment time; and
- automatically reassign the requested appointment associated with the service order to another network resource in order to fulfill the requested appointment at the alternative appointment time, in response to notifying the appointment negotiator to reschedule the service order and the appointment negotiator contacting the customer.

2. The appointment setting system of claim 1, wherein the appointment control system is a computer-implemented system that is electronically accessible by the appointment negotiator.

3. The appointment setting system of claim 1, wherein the dispatch database record is an electronic record comprising a network resource schedule.

4. The appointment setting system of claim 1, wherein the dispatch database record is an electronic record comprising a set of tasks to which the network resource can be assigned.

5. The appointment setting system of claim 1, wherein the dispatch database further comprises appointments assigned to the another network resource.

6. The appointment setting system of claim 1, wherein the appointment control system is further operative to deliver the appointment rejection to the appointment negotiator, in response to a determination that the network resource cannot fulfill the service order.

7. The appointment setting system of claim 1, wherein the appointment control system is further operative to receive the service order from a third party through a third party gateway.

8. The appointment setting system of claim 1, wherein if the appointment cannot be reassigned, rescheduling the service order.

9. A computerized method for setting an appointment, the method comprising:
- receiving a service order from an appointment negotiator, the service order comprising a requested appointment time;
- receiving updated availability and capacity information associated with a network resource from a dispatch database comprising a technician table and an appointments table, wherein the dispatch database is configured to maintain real time availability and capacity information associated with a plurality of network resources;
- determining whether the network resource can fulfill the service order based on the updated availability and capacity information;
- sending an appointment rejection to the appointment negotiator, in response to a determination that the network resource cannot fulfill the service order;
- sending an appointment confirmation to the appointment negotiator and assigning a requested appointment associated with the service order to the network resource for completion of the requested appointment, in response to a determination that the network resource can fulfill the service order;
- continuously updating the dispatch database to reflect a reduction in a capacity value associated with the network resource, in response to sending the appointment confirmation;
- determining whether availability of the network resource has changed;
- if the availability of the network resource has changed, then determining whether the change affects the appointment associated with the service order;
- if the change affects the appointment associated with the service order, then determining whether another network resource is qualified to fulfill the service order and is available at the requested appointment time;
- if another qualified network resource is available to fulfill the service order at the recuested appointment time, automatically reassign the appointment to the other qualified network resource without requiring the involvement of the appointment negotiator
- no other qualified network resource is available to fulfill the service order at the requested appointment time, then notifying the appointment negotiator to reschedule the service order, wherein the appointment negotiator contacts a customer requesting the service order to reschedule the service order at an alternative appointment time; and
- automatically reassigning the appointment to another network resource to fulfill completion of the requested appointment at the alternative appointment time in response to notifying the appointment negotiator to reschedule the service order and the appointment negotiator contacting the customer.

10. The method of claim 9, wherein the service order comprises the requested appointment time, an appointment location, and a service task.

11. The method of claim 9, wherein determining whether a network resource can fulfill the service order comprises accessing the dispatch database to determine whether the network resource is qualified to perform the service task.

12. The method of claim 9, wherein determining whether a network resource can fulfill the service order comprises accessing the dispatch database to determine whether the network resource can be near the appointment location approximatelly at the requested appointment time.

13. The method of claim 9, wherein determining whether a network resource can fulfill the service order comprises accessing the dispatch database to determine whether the network resource is committed to another service order at the requested appointment time.

14. The method of claim 9, wherein updating a dispatch database to reflect a reduction in a capacity value associated with the network resource comprises modifying a dispatch database record to indicate a commitment of the network resource to perform the service task at the requested appointment time and at the appointment location.

15. The method of claim 9, further comprising delivering the appointment rejection to the appointment negotiator, in response to a determination that the change affects the appointment associated with the service order.

16. The method of claim 9, further comprising receiving the service order from a third party, via a third party gateway.

17. The method of claim 9, wherein if the appointment cannot be reassigned, rescheduling the service order.

18. A computerized method for setting an appointment, the method comprising:

receiving a service order from an appointment negotiator, the service order comprising a requested appointment time;

determining whether a network resource can fulfill the service order, by checking the records of a dispatch database for updated availability and capacity information associated with the network resource, wherein the dispatch database comprises a technician table and an appointments table and is configured to maintain real time availability and capacity information associated with a plurality of network resources;

sending an appointment rejection to the appointment negotiator, in response to a determination that the network resource cannot fulfill the service order;

sending an appointment confirmation to the appointment negotiator, in response to a determination that the network resource can fulfill the service order according to a requested appointment time;

assigning the appointment to the network resource based on the requested appointment, wherein the appointment is scheduled for the network resource;

updating the dispatch database record to reflect the assignment of the appointment to the network resource, in response to sending the appointment confirmation;

continuously determining whether a change has occurred to the dispatch database record;

determining whether the change affects the appointment, in response to a determination that the change has occurred to the dispatch database record;

determining whether another network resource from the technician table is qualified to fulfill the service order and is available at the requested appointment time, in response to a determination that the change affects the appointment associated with the service order;

if another qualified network resource is available to fulfill the service order at the requested appointment time, automatically reassign the appointment to the other qualified network resource without requiring the involvement of the appointment negotiator notifying the appointment negotiator to reschedule the service order, in response to a determination that no other qualified network resource is available to fulfill the service order at the requested appointment time, wherein the appointment negotiator contacts a customer requesting the service order to reschedule the service order at an alternative appointment time; and automatically reassigning the appointment to another network resource to fulfill the requested appointment at the alternative appointment time, in response to notifying the appointment negotiator to reschedule the service order and the appointment negotiator contacting the customer.

* * * * *